United States Patent [19]

McClean

[11] Patent Number: 4,700,901
[45] Date of Patent: Oct. 20, 1987

[54] FOOD PROCESSORS

[75] Inventor: John W. McClean, Lakemba, Australia

[73] Assignee: Breville R & D Pty. Limited, New South Wales, Australia

[21] Appl. No.: 891,281

[22] Filed: Jul. 31, 1986

[30] Foreign Application Priority Data

Aug. 19, 1985 [AU] Australia .............................. PH02018

[51] Int. Cl.$^4$ .............................................. B02L 18/12
[52] U.S. Cl. .................................. 241/37.5; 241/282.1
[58] Field of Search ..................... 241/37.5, 92, 282.1, 241/282.2

[56] References Cited

U.S. PATENT DOCUMENTS 4,226,373 10/1980 Williams .............................. 241/37.5

Primary Examiner—Timothy V. Eley
Attorney, Agent, or Firm—Murray and Whisenhunt

[57] ABSTRACT

A food processor which is rendered suitable for placing in a microwave oven by the replacement of the usual metal spring controlling a switch actuating member by a resilient member fabricated from a material such as silicone rubber that is not affected by microwave radiation. Such a food processor may be provided with a special lid having a downwardly extending member arranged to co-operate with the usual central sleeve of the container of the food processor so that a cake mixture prepared in the food processor can be baked in the container in which it is prepared, the depending member preventing overflow of the cake mixture through the sleeve.

3 Claims, 2 Drawing Figures

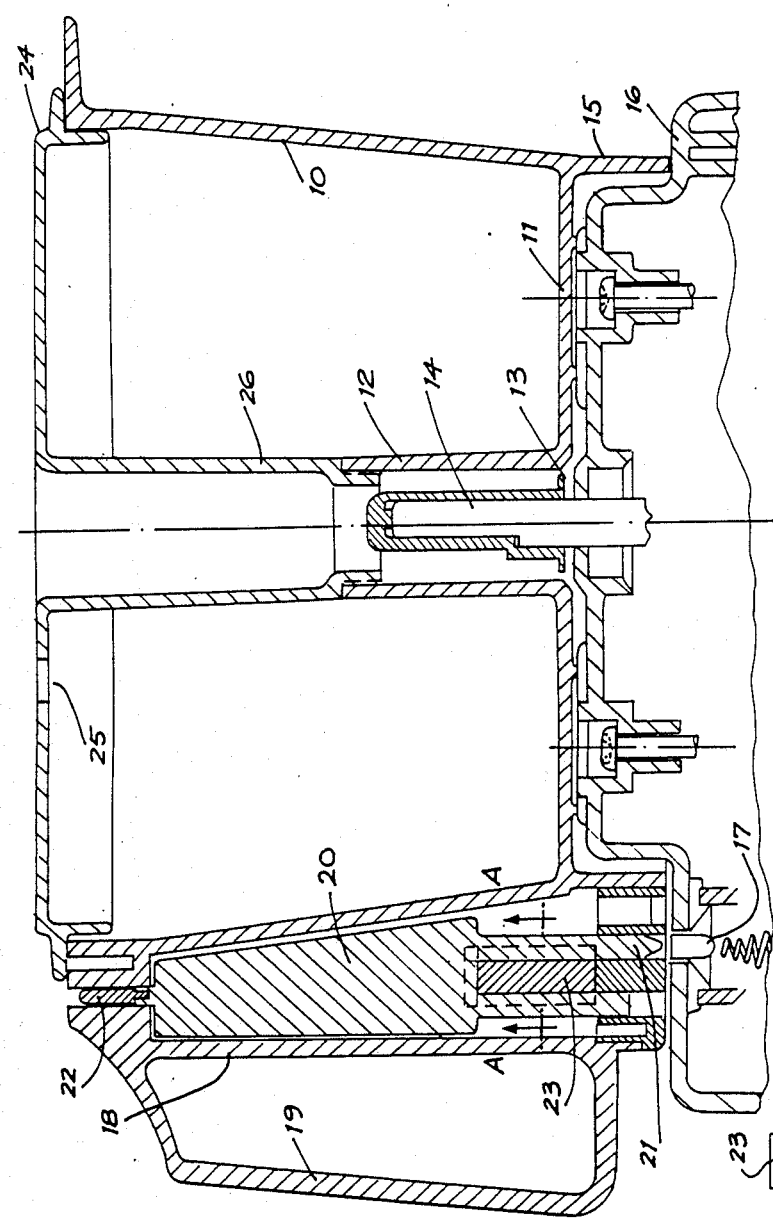
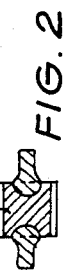
FIG.1
FIG.2

FOOD PROCESSORS

The present invention relates to improvements in food processors and more particularly to a food processing container suitable for use in microwave ovens.

BACKGROUND OF THE INVENTION

Many food processors based essentially on a type of food processor described in the specification of British patent No. 1,380,318 have been marketed throughout the world.

Such food processors referred to as "the kind described" consist of a base containing an electric driving motor and electric switch means for controlling the operation of the driving motor, an aperture in the upper surface of the base through which a driving shaft from the said motor projects, a substantially cylindrical food processing container, complementary means on the container whereby the container is removably attached to the upper surface of the base with the driving motor shaft projecting through a hole in the bottom of the container, a sleeve in the container surrounding said hole and projecting upwardly into the container to form an annular liquid containing well around the hole, externally accessible means on the base associated with the electric switch means, a lid adapted to be removably attached about the periphery of the container, means on the container arranged to co-operate with said externally accessible means and means on the lid co-operating with said last mentioned means in such a manner that, when the lid is fixed to the container in a predetermined relationship, the said electric switch means is actuated.

The means on the container arranged to co-operate with the said externally accessible means usually consist of a shaft or like longitudinally extending member arranged at one side of the container and extending parallel to the axis thereof and movable axially against the action of a metallic spring acting to urge it in a direction away from the base. When the lid is correctly positioned an extension of the lower end of the member makes contact with said externally accessible means on the base actuating the switch means.

It has now been appreciated that containers for food processors of the kind described above can also be used as containers for cooking food processed in the food processor in a microwave oven thus avoiding the necessity for transferring the processed food to another container. With existing containers however this is not practical because of the presence of the metallic spring; as is well known, metals placed in a microwave oven are heated to high temperatures. Furthermore such longitudinally extending members are usually made of nylon which, if subjected to heat, tend to buckle. An object of the present invention is to provide a container for such a food processor which can be placed in a microwave oven with food in it and the food cooked in that container.

It has been further realised that one use of such a container would be for the baking of cakes. The volume of food to be processed that can be placed in the container is, however, limited by the height of the sleeve. If however, a cake mixture is created in the food processor with the level of the mixture slightly below the top of the sleeve and such a mixture is then baked in a microwave oven the cake mixture will rise and expand to fill the entire volume of the container. It is thus a further object of the invention to provide a form of lid which will permit this expansion to take place without overflow down the sleeve.

SUMMARY OF THE INVENTION

The present invention consists in a substantially cylindrically food processing container for a food processor of the kind described above consisting of a container bowl adapted to be removably attached to the upper surface of the base of a food processor, there being a sleeve projecting upwardly from the centre of the bottom of the container and open at its upper end surrounding a hole through which a driving motor shaft of the food processor can project, a switch actuating member arranged externally of the container and movable in a direction parallel to the axis thereof, said member being shaped and constructed so that movement in the direction of a food processor to which the container is attached actuates electric switch means of the food processor, movement of the said member in that direction being resisted by resilient means the temperature of which is not varied significantly when subjected to radiation in a mircrowave oven, the said member and the container also being made of material substantially unaffected by radiation in a microwave oven.

The invention further comprises the combination of a container as defined in the last preceding paragraph with a lid adapted to fit onto the container to close the top thereof, said lid having a depending member adapted to cooperate with the sleeve of the container to prevent contents of the container from passing into the open upper end of the container sleeve.

BRIEF DESCRIPTION OF THE DRAWINGS

In order that the nature of the invention may be better understood a preferred form thereof is hereinafter described by way of example with reference to the accompanying drawings in which:

FIG. 1 is a cross-sectional view of a container according to the invention mounted on the base of a food processor of the kind described above; and FIG. 2 is a cross-section on line A—A of FIG. 1.

DETAILED DESCRIPTION OF THE INVENTION

The food processing container consists of a substantially cylindrical wall 10 projecting upwardly from a circular bottom 11. The angle made by the wall 10 and the bottom 11 is preferably greater than a right angle in that this assists in the removal of cooked articles such as a baked cake from the container. An open ended sleeve 12 projects upwardly from the bottom 11 of the container and surrounds a hole 13 through which the motor shaft 14 of a driving motor (not shown) projects.

The container is provided with a skirt 15 which is provided with inter-engaging means (not shown) whereby the container may be attached to the casing 16 of a food processor of the kind described in a conventional manner.

Within the casing 16 is a switch operating means 17 by means of which an electric switch (not shown), within the casing 16, can be operated in a conventional manner.

An extension 18 of the container provides a handle 19 and also accommodates a switch operating member 20 which is movable linearly in a direction substantially parallel to the axis of the container 10. The member 20 is preferably made of plastic material such as polycarbonate which is unaffected by radiation in a microwave oven. The same material is also suitable for making the remainder of the container. At the lower end of the member 20 is a projection 21 which when moved downwardly acts on the switch operating means 17 causing the electric switch in the base 16 to be actuated. At the upper end of the member 20 is a projection 22 which is preferably of a material such as delrin, which in normal use of the food processor is acted on by a cam on the normal lid (not shown) of the container 10. The use of delrin is preferred as if the projection 22 were made of polycarbonate and the cam on the lid of the same material the rubbing of the two together could damage them.

The member 20 is maintained in the position shown in FIG. 1 by means of a block 23 of silicone rubber which acts as a spring but which is unaffected by microwave radiation.

For use in baking cakes the container 10 is provided with a special lid 24 which fits on the top of the container in the manner shown in FIG. 1 but which does not interact with the projection 22 to displace the member 20. It has in its upper surface a vent hole 25 and at its centre a downwardly projecting sleeve 26, the lower end of which is arranged to fit within the sleeve 12 of the container 10 in such a manner as to produce what is in effect a substantially continuous sleeve within the container. If a cake mix is prepared in the container using its normal lid, the upper level of the mix lying below the top of the sleeve 12 and the container with the mix in it is transferred to a microwave oven to cook the cake mixture after substituting the special lid 24 for the normal lid, the mixture will rise in the container driving out air through the aperture 25 and will cook to form a normal cake. This cake can then be removed from the container by removing the lid 24 and inverting the container. The fact that the walls of the container are at an angle greater than a right angle to the bottom 11 assists in the release of the cake and the fact that there is a tubular space at the centre of the cake assists its cooking in a microwave oven. This characteristic is well known.

Ihe present invention thus provides a container for a food processor of the kind described which can be transferred directly to a microwave oven for cooking a foodstuff contained within the container without fear of adverse effects of the microwave radiation on the usual metallic spring and when used in conjunction with the special lid the container functions as a suitable baking dish for a cake mixture that has been prepared in the food processor.

It will be recognised by persons skilled in the art that numerous variations and modifications may be made to the invention as described above without departing from the spirit or scope of the invention as broadly described.

I claim:

1. A substantially cylindrical food processing container for a food processor, said container comprising:

a container bowl having an axis and a bottom, said container bowl being removably attachable to an upper surface of a base of a food processor;

a sleeve projecting upwardly from the center of said bottom of said container bowl, said sleeve being open at its upper end and surrounding a hole through which a driving motor shaft of a food processor can project;

a switch actuating member connected externally of said container bowl and movable in a direction sub-stantially parallel to said axis of said container bowl, said switch actuating member actuating an electric switch means of a food processor when the container is attached to a food processor, upon movement of said switch actuating member in the direction of the food processor;

resilient means for resisting movement of said switch actuating member in the direction of a food processor, said resilient means comprising a block of silicone rubber, the temperature of said silicone rubber not varying significantly when subjected to radiation in a microwave oven, said switch actuating member and container also being made of material substantially unaffected by radiation in a microwave oven.

2. A food processing container as claimed in claim 1, wherein said switch actuating member is made of polycarbonate.

3. A food processing container as claimed in claim 1 or 2, and further including a lid fitting onto said container to close the top thereof, said lid having a central depending member extending to said sleeve in the container and acting to close the upper end of said sleeve, thereby preventing the contents of the container from passing into said sleeve.

* * * * *